US012243187B2

(12) United States Patent
Judi et al.

(10) Patent No.: US 12,243,187 B2
(45) Date of Patent: Mar. 4, 2025

(54) EYEWEAR SYNCHRONIZED WITH UAV IMAGE CAPTURING SYSTEM

(71) Applicants: Terek Judi, Long Beach, CA (US); Rajan Vaish, Beverly Hills, CA (US)

(72) Inventors: Terek Judi, Long Beach, CA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 693 days.

(21) Appl. No.: 17/464,911

(22) Filed: Sep. 2, 2021

(65) Prior Publication Data

US 2023/0063386 A1 Mar. 2, 2023

(51) Int. Cl.
*G06T 3/4038* (2024.01)
*B64C 39/02* (2023.01)
*B64U 101/30* (2023.01)
*G02B 27/01* (2006.01)
*G05D 1/00* (2024.01)

(52) U.S. Cl.
CPC .......... *G06T 3/4038* (2013.01); *B64C 39/024* (2013.01); *G02B 27/0101* (2013.01); *G02B 27/0172* (2013.01); *G05D 1/0016* (2013.01); *G05D 1/0038* (2013.01); *G05D 1/101* (2013.01); *B64U 2101/30* (2023.01); *B64U 2201/20* (2023.01); *G02B 2027/0138* (2013.01); *G02B 2027/0178* (2013.01)

(58) Field of Classification Search
CPC ..................................................... G06T 3/4038
See application file for complete search history.

(56) References Cited

U.S. PATENT DOCUMENTS 10,139,631 B1 * 11/2018 Da Veiga ............. G05D 1/0094
2016/0349849 A1 * 12/2016 Kwon ...................... G06F 3/017
2021/0118089 A1 * 4/2021 Hare ......................... G06T 3/08
(Continued)

FOREIGN PATENT DOCUMENTS

CN 109561282 A * 4/2019 ............. G05D 1/101

OTHER PUBLICATIONS

Gawel Abel et al: "Aerial-Ground collaborative sensing: Third-Person view for teleoperation", 2018 IEEE International Symposium on Safety, Security, and Rescue Robotics (SSRR), IEEE, Aug. 6, 2018 (Aug. 6, 2018), pp. 1-7.
(Continued)

*Primary Examiner* — Benjamin O Dulaney
(74) *Attorney, Agent, or Firm* — CM Law; Stephen J. Weed

(57) ABSTRACT

Eyewear configured to capture a video image of an object, and to control an unmanned aerial vehicle (UAV) to capture a video image of the object to produce stitched video images. The eyewear has an eyewear camera generating the eyewear video image, and the UAV has a UAV camera generating the UAV video image, wherein a processor timestamps frames of each of the video images. When the eyewear begins recording of the object, the eyewear controls the UAV camera to also begin recording the object. The stitched video images are synchronized to each other using the timestamps, wherein the stitched video images can be displayed on an eyewear display or a remote display. The processor compensates for any latency between when the eyewear begins recording and when the UAV begins recording.

20 Claims, 18 Drawing Sheets

(56) References Cited

U.S. PATENT DOCUMENTS

2022/0113720 A1* 4/2022 Shapira ................ G08G 5/0026
2023/0097676 A1* 3/2023 Yap ......................... G06F 1/163
　　　　　　　　　　　　　　　　　　　　　　　　701/2

OTHER PUBLICATIONS

International Search Report and Written Opinion for International Application No. PCT/US2022/040702, dated Nov. 11, 2022 (Nov. 11, 2022)—9 pages.

* cited by examiner

EYEWEAR SYNCHRONIZED WITH UAV IMAGE CAPTURING SYSTEM

TECHNICAL FIELD

The present subject matter relates to an eyewear device, e.g., smart glasses having see-through displays and unmanned aerial vehicles (UAVs).

BACKGROUND

Portable eyewear devices, such as smart glasses, headwear, and headgear available today integrate devices including cameras and see-through displays. UAVs, including drones, are aircraft without a human pilot aboard.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
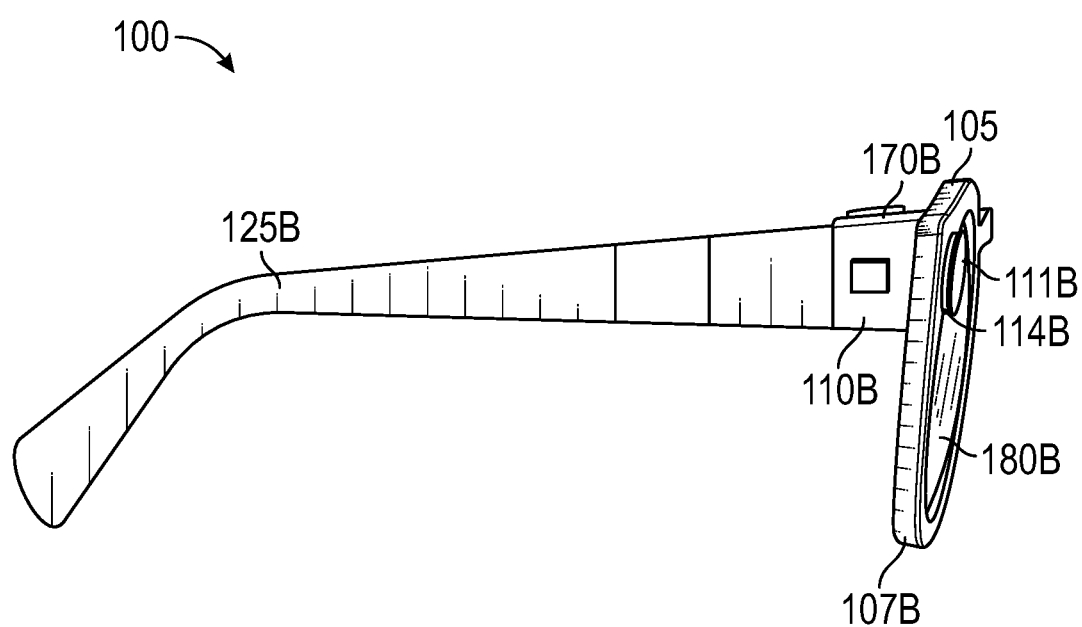
FIG. 1A is a side view of an example hardware configuration of an eyewear device, which shows a right optical assembly with an image display, and field of view adjustments are applied to a user interface presented on the image display based on detected head or eye movement by a user.

Examples described herein include eyewear configured to capture a video image of an object, and to control an unmanned aerial vehicle (UAV) to capture a video image of the object to produce stitched video images. The eyewear has an eyewear camera generating an eyewear video image, and the UAV has a UAV camera generating a UAV video image, wherein a processor timestamps frames of each of the video images. When the eyewear begins recording of the object, the eyewear controls the UAV camera to also begin recording the object. The stitched video images are synchronized to each other using the timestamps, wherein the stitched video images can be displayed on an eyewear display or a remote display. The processor compensates for any latency between when the eyewear begins recording and when the UAV begins recording.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical, or electrical connection, link, or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 2A:
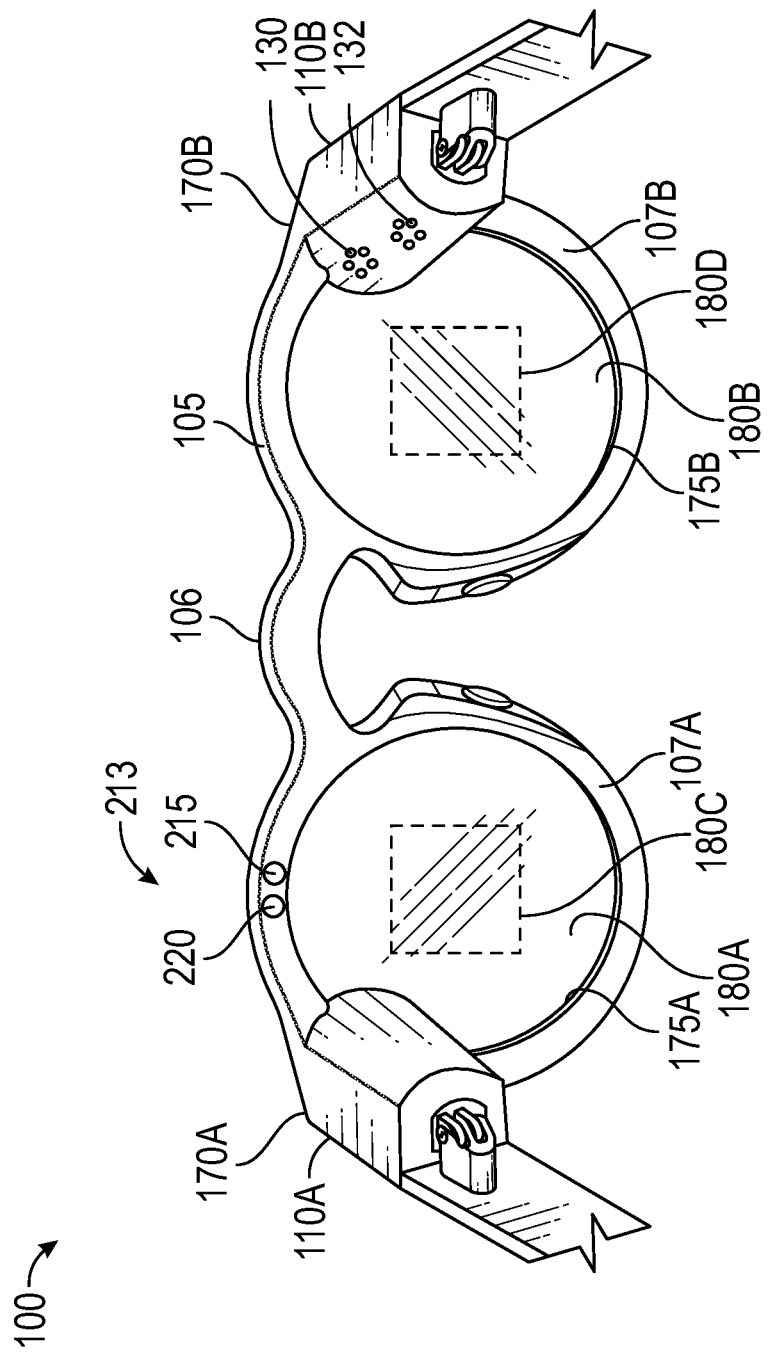
FIG. 2A is a rear view of an example hardware configuration of an eyewear device, which includes an eye scanner on a frame, for use in a system for identifying a user of the eyewear device.

FIG. 1A is a side view of an example hardware configuration of an eyewear device 100, which includes a right optical assembly 180B with an image display 180D (FIG. 2A). Eyewear device 100 includes multiple visible light cameras 114A-B (FIG. 7) that form a stereo camera, of which the right visible light camera 114B is located on a right temple 110B.

The left and right visible light cameras 114A-B have an image sensor that is sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light camera 114A-B and process those signals from the visible light cameras 114A-B into a format suitable for storage in the memory (element 934 of FIG. 9). The timestamp can be added by the image processor 912 or other processor, which controls operation of the visible light cameras 114A-B. Visible light cameras 114A-B allow the stereo camera to simulate human binocular vision. Stereo cameras provide the ability to reproduce three-dimensional images (element 715 of FIG. 7) based on two captured images (elements 758A-B of FIG. 7) from the visible light cameras 114A-B, respectively, having the same timestamp. Such three-dimensional images 715 allow for an immersive life-like experience, e.g., for virtual reality or video gaming. For stereoscopic vision, the pair of images 758A-B are generated at a given moment in time—one image for each of the left and right visible light cameras 114A-B. When the pair of generated images 758A-B from the frontward facing angles of coverage 111A-B of the left and right visible light cameras 114A-B are stitched together (e.g., by the image processor 912), depth perception is provided by the optical assembly 180A-B.

In an example, a user interface field of view adjustment system includes the eyewear device 100. The eyewear device 100 includes a frame 105, a right temple 110B extending from a right lateral side 170B of the frame 105, and a see-through image display 180D (FIGS. 2A-B) comprising optical assembly 180B to present a graphical user interface to a user. The eyewear device 100 includes the left visible light camera 114A connected to the frame 105 or the left temple 110A to capture a first image of the scene. Eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, the user interface field of view adjustment system further includes the processor 932 coupled to the eyewear device 100 and connected to the visible light cameras 114A-B, the memory 934 accessible to the processor 932, and programming in the memory 934, for example in the eyewear device 100 itself or another part of the user interface field of view adjustment system.

Figure 1B:
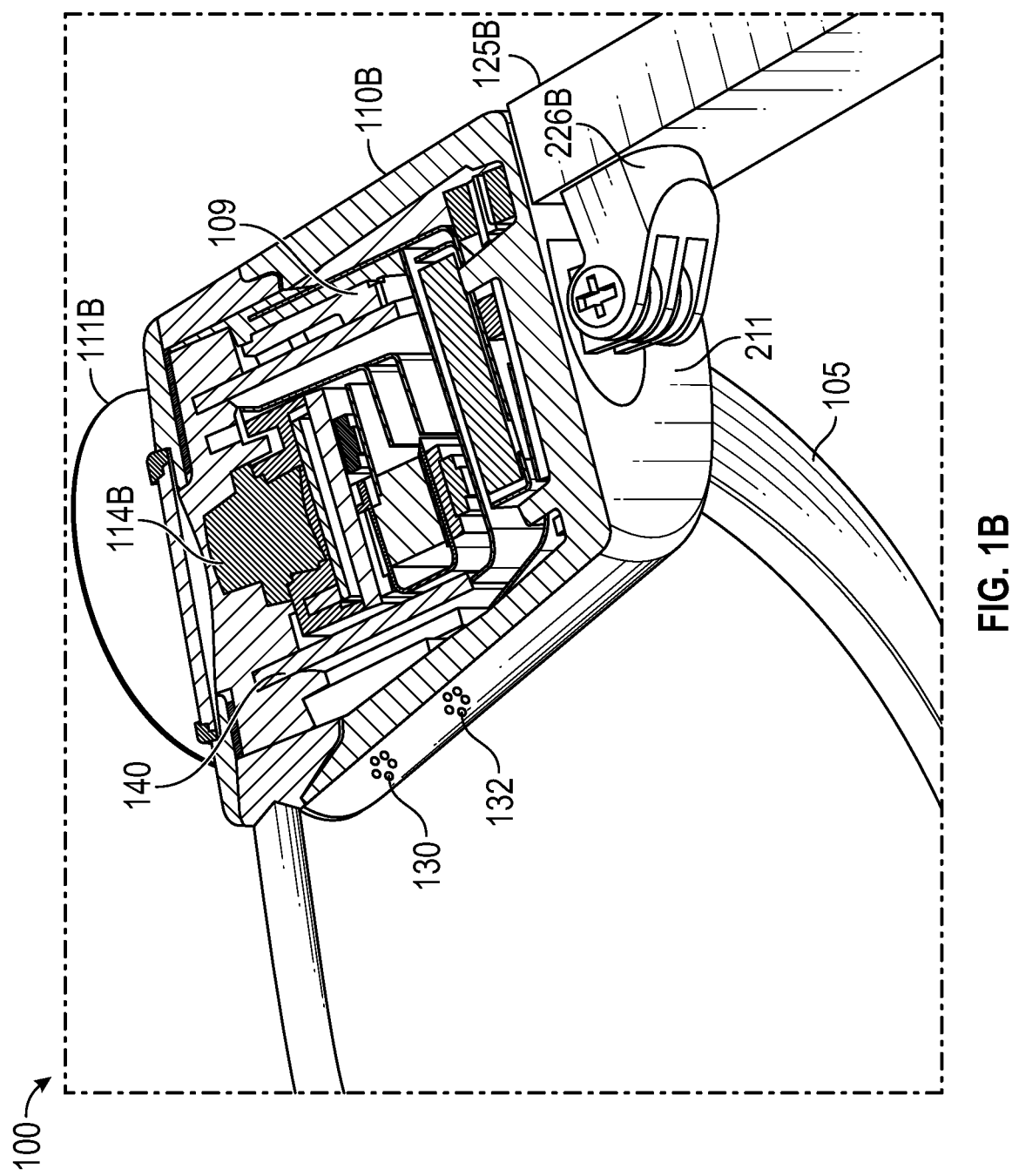
FIG. 1B is a top cross-sectional view of a temple of the eyewear device of FIG. 1A depicting a visible light camera, a head movement tracker for tracking the head movement of the user of the eyewear device, and a circuit board.
Figure 2B:
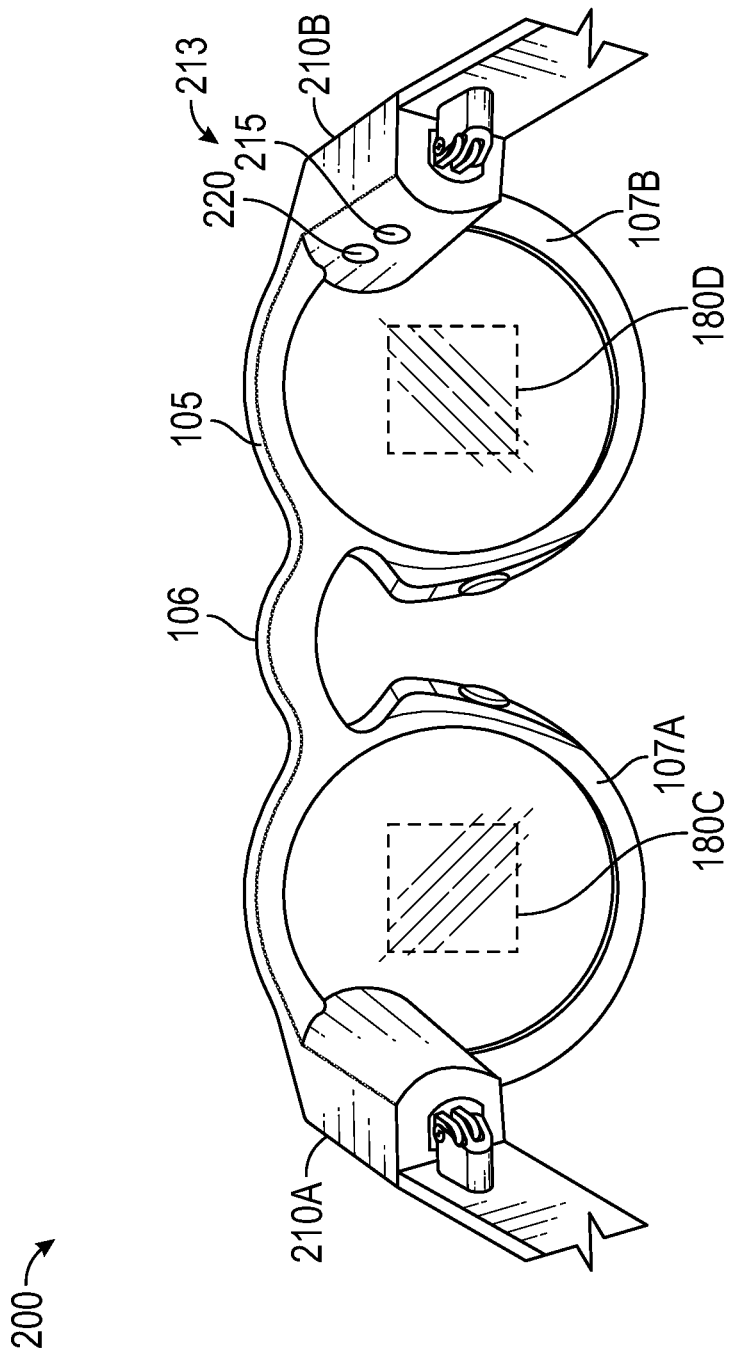
FIG. 2B is a rear view of an example hardware configuration of another eyewear device, which includes an eye scanner on a temple, for use in a system for identifying a user of the eyewear device.

Although not shown in FIG. 1A, the eyewear device 100 also includes a head movement tracker (element 109 of FIG. 1B) or an eye movement tracker (element 213 of FIG. 2B). Eyewear device 100 further includes the see-through image displays 180C-D of optical assembly 180A-B for presenting a sequence of displayed images, and an image display driver (element 942 of FIG. 9) coupled to the see-through image displays 180C-D of optical assembly 180A-B to control the image displays 180C-D of optical assembly 180A-B to present the sequence of displayed images 715, which are described in further detail below. Eyewear device 100 further includes the memory 934 and the processor 932 having access to the image display driver 942 and the memory 934. Eyewear device 100 further includes programming (element 934 of FIG. 9) in the memory. Execution of the programming by the processor 932 configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (element 230 of FIG. 5).

Execution of the programming by the processor 932 further configures the eyewear device 100 to detect movement of a user of the eyewear device by: (i) tracking, via the head movement tracker (element 109 of FIG. 1B), a head movement of a head of the user, or (ii) tracking, via an eye movement tracker (element 213 of FIGS. 2A-B, FIG. 5), an eye movement of an eye of the user of the eyewear device 100. Execution of the programming by the processor 932 further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor 932 further configures the eyewear device 100 to generate a successive displayed image of the sequence of displayed images based on the field of view adjustment. Execution of the programming by the processor 932 further configures the eyewear device 100 to present, via the see-through image displays 180C-D of the optical assembly 180A-B, the successive displayed images.

FIG. 1B is a top cross-sectional view of the temple of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B, a circuit board, which may be a flexible printed circuit board (PCB) 140, and a battery 142 configured to power eyewear 100. The left hinge 226A connects the left temple 110A to a left temple extension 125A of the eyewear device 100. In some examples, components of the left visible light camera 114A, the flexible PCA 140, or other electrical connectors or contacts may be located on the left temple extension 125A or the left hinge 226A. The right hinge 226B connects the right temple 110B to a right temple extension 125B of the eyewear device 100. In some examples, components of the right visible light camera 114B, the flexible PCB 140, or other electrical connectors or contacts may be located on the right temple extension 125B or the right hinge 226B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means ±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right temple 110B includes temple body 211 and a temple cap, with the temple cap omitted in the cross-section of FIG. 1B. Disposed inside the right temple 110B are various interconnected circuit boards, such as PCBs or flexible PCBs, that include controller circuits for right visible light camera 114B, microphone(s) 130, speaker(s) 132, low-power wireless circuitry and antennas (e.g., for wireless short-range network communication via Bluetooth™), and high-speed wireless circuitry and antennas (e.g., for wireless local area network communication via WiFi and positioning via GPS).

The right visible light camera 114B is coupled to or disposed on the flexible PCB 240 and covered by a visible light camera cover lens, which is aimed through opening(s) formed in the right temple 110B. In some examples, the frame 105 connected to the right temple 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing angle of coverage 111B with a line of sight or perspective of the right eye of the user of the eyewear device 100. The visible light camera cover lens can also be adhered to an outward facing surface of the right temple 110B in which an opening is formed with an outwards facing angle of coverage, but in a different outwards direction. The coupling can also be indirect via intervening components.

Left (first) visible light camera 114A is connected to the left see-through image display 180C of left optical assembly 180A to generate a first background scene of a first successive displayed image. The right (second) visible light camera 114B is connected to the right see-through image display 180D of right optical assembly 180B to generate a second background scene of a second successive displayed image. The first background scene and the second background scene partially overlap to present a three-dimensional observable area of the successive displayed image.

Flexible PCB 140 is disposed inside the right temple 110B and is coupled to one or more other components housed in the right temple 110B. Although shown as being formed on the circuit boards of the right temple 110B, the right visible light camera 114B can be formed on the circuit boards of the left temple 110A, the temples 125A-B, or frame 105.

FIG. 2A is a rear view of an example hardware configuration of an eyewear device 100, which includes an eye scanner 213 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-

D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into temples (not shown) attached to the frame 105.

In the example of FIG. 2A, the eye scanner 213 includes an infrared emitter 215 and an infrared camera 220. Visible light cameras typically include a blue light filter to block infrared light detection, in an example, the infrared camera 220 is a visible light camera, such as a low-resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. The frame 105 or one or more of the left and right temples 110A-B include a circuit board (not shown) that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. In another example, the infrared emitter 215 is on the frame 105 and the infrared camera 220 is on one of the temples 110A-B, or vice versa. The infrared emitter 215 can be connected essentially anywhere on the frame 105, left temple 110A, or right temple 110B to emit a pattern of infrared light. Similarly, the infrared camera 220 can be connected essentially anywhere on the frame 105, left temple 110A, or right temple 110B to capture at least one reflection variation in the emitted pattern of infrared light.

The infrared emitter 215 and infrared camera 220 are arranged to face inwards towards an eye of the user with a partial or full field of view of the eye in order to identify the respective eye position and gaze direction. For example, the infrared emitter 215 and infrared camera 220 are positioned directly in front of the eye, in the upper part of the frame 105 or in the temples 110A-B at either ends of the frame 105.

FIG. 2B is a rear view of an example hardware configuration of another eyewear device 200. In this example configuration, the eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold the respective optical elements 180A-B comprising the see-through display 180C-D.

Figure 2C:
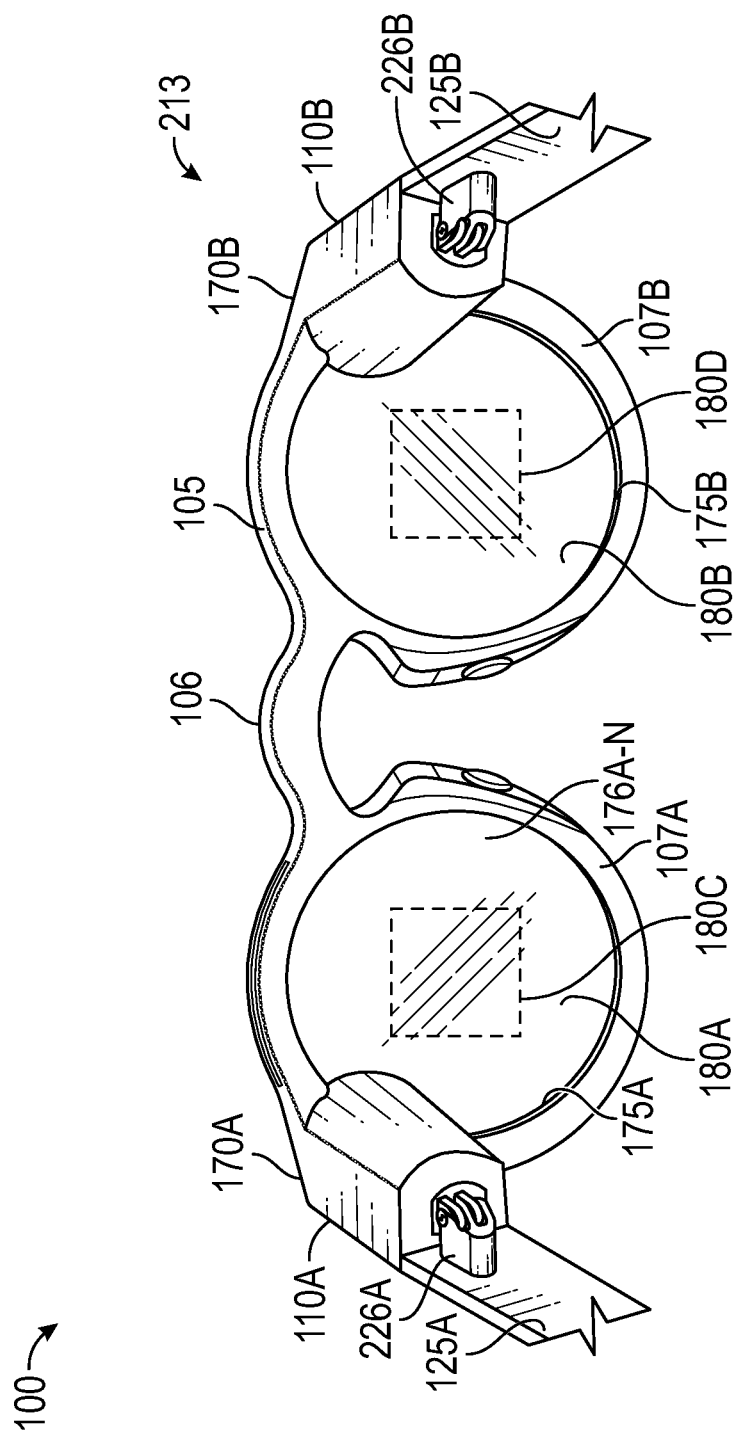
FIGS. 2C and 2D are rear views of example hardware configurations of the eyewear device, including two different types of image displays.
Figure 2D:
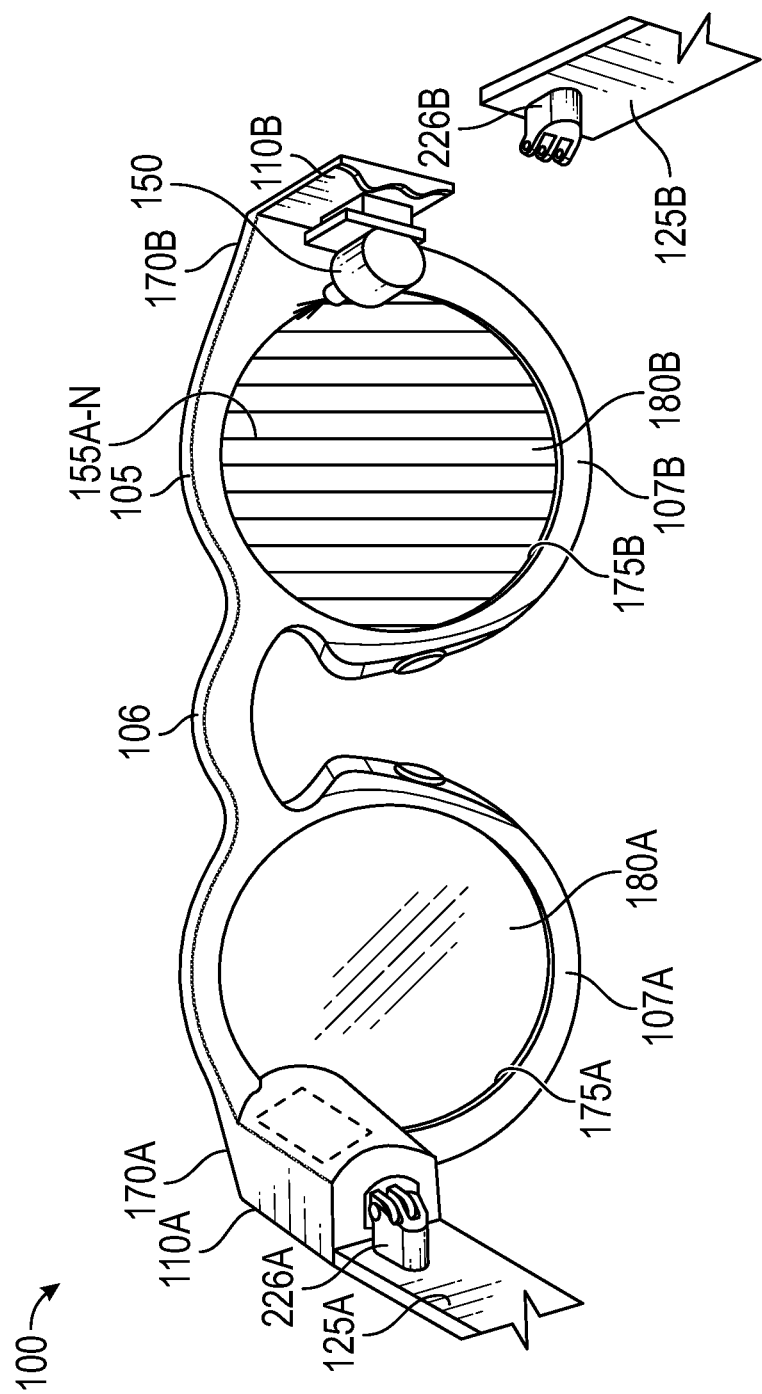

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B include a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical assembly 180A-B. The first optical assembly 180A includes the first see-through image display 180C (e.g., a display matrix of FIG. 2C or optical strips 155A-N' and a projector 150A). The second optical assembly 180B includes the second see-through image display 180D e.g., a display matrix of FIG. 2C or optical strips 155A-N" and a projector 150B). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
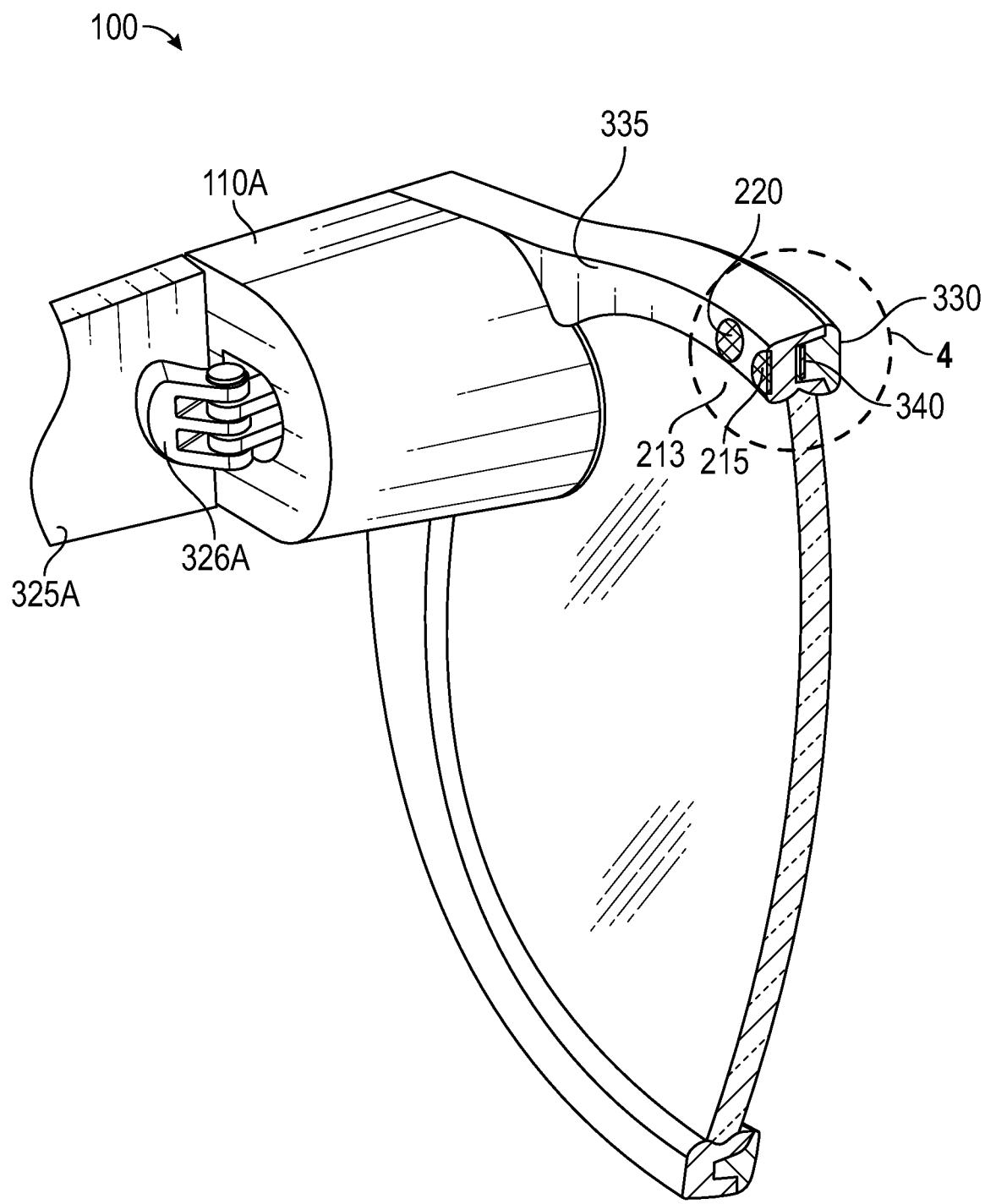
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left temple 110A to the left temple extension 325A via the left hinge 326A. In some examples, components of the eye movement tracker 213, including the infrared emitter 215, the flexible PCB 340, or other electrical connectors or contacts may be located on the left temple extension 325A or the left hinge 326A.

Figure 4:
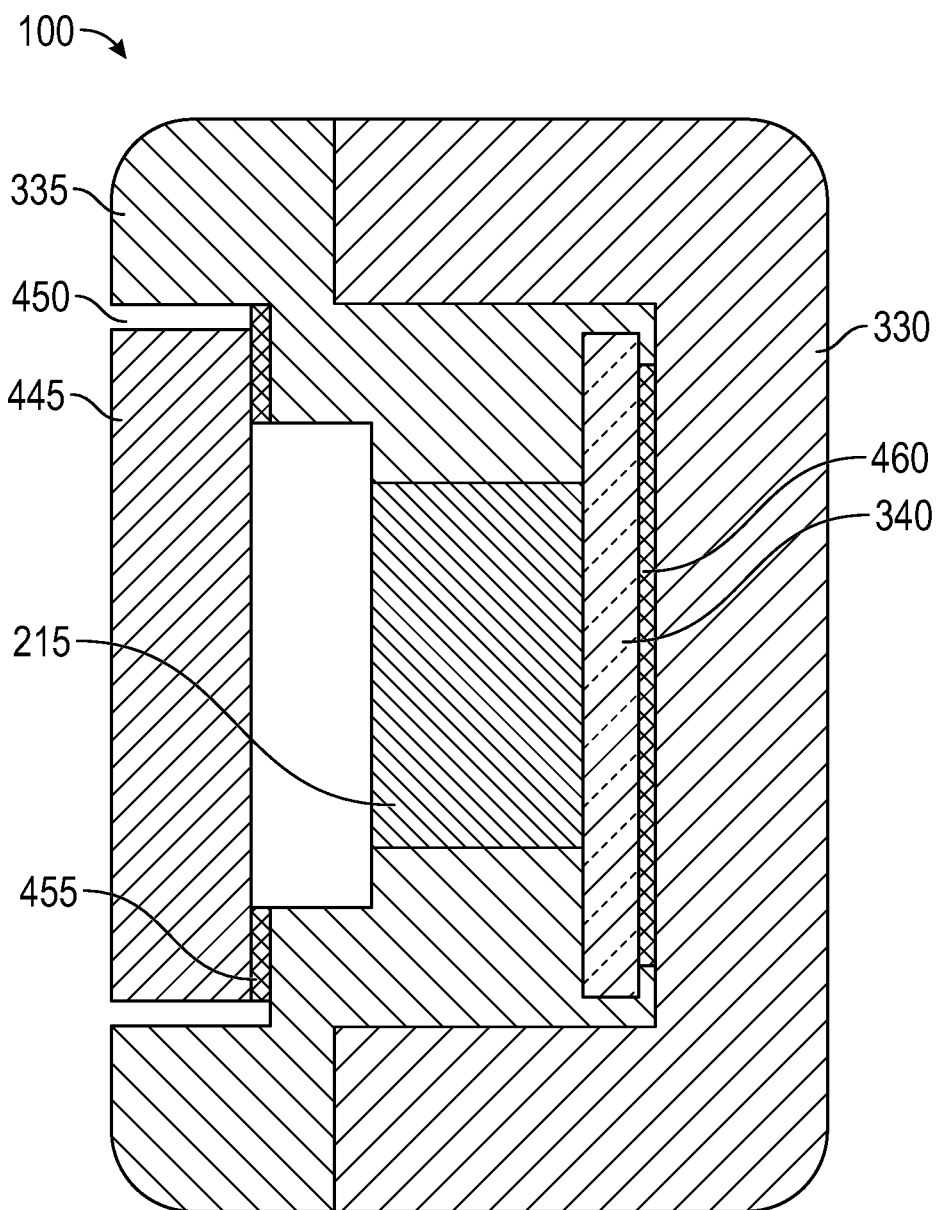
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
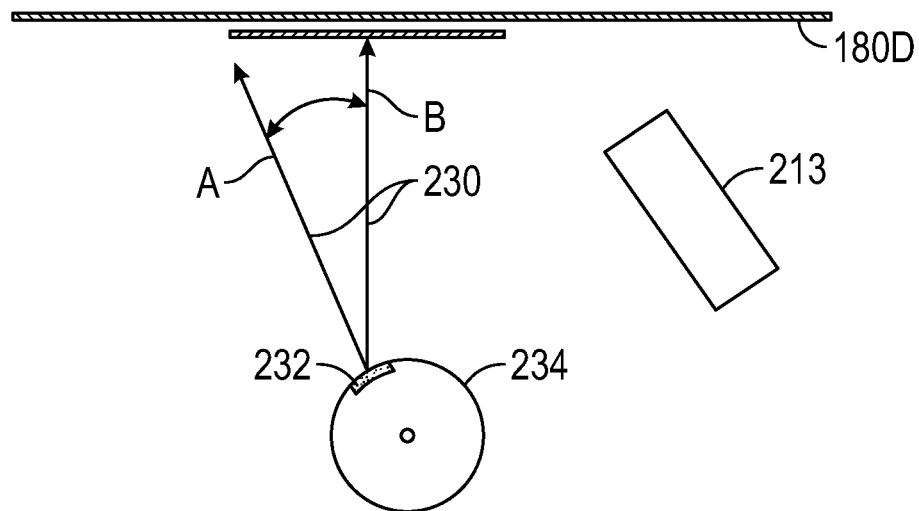
FIG. 5 illustrates detecting eye gaze direction.
Figure 6:
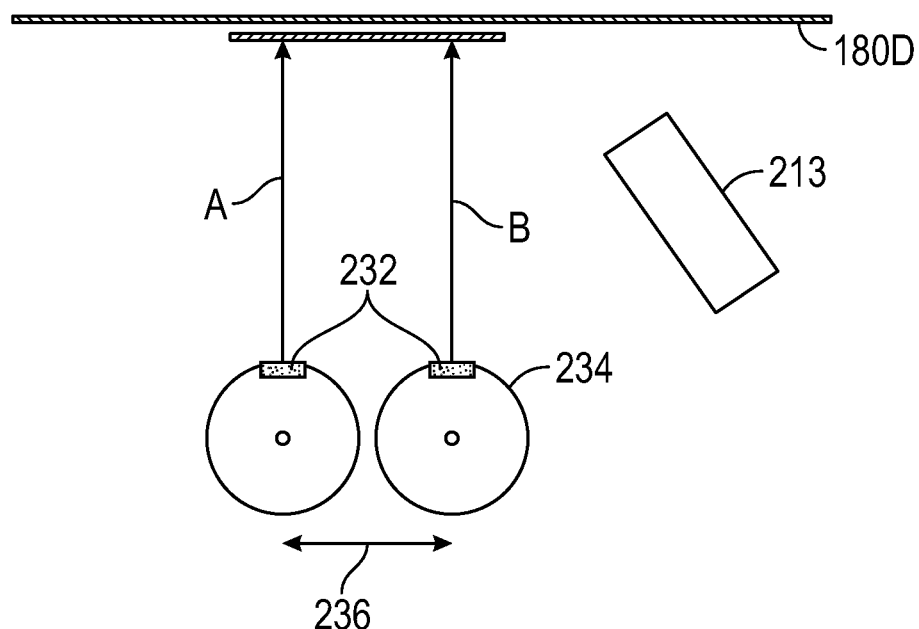
FIG. 6 illustrates detecting eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
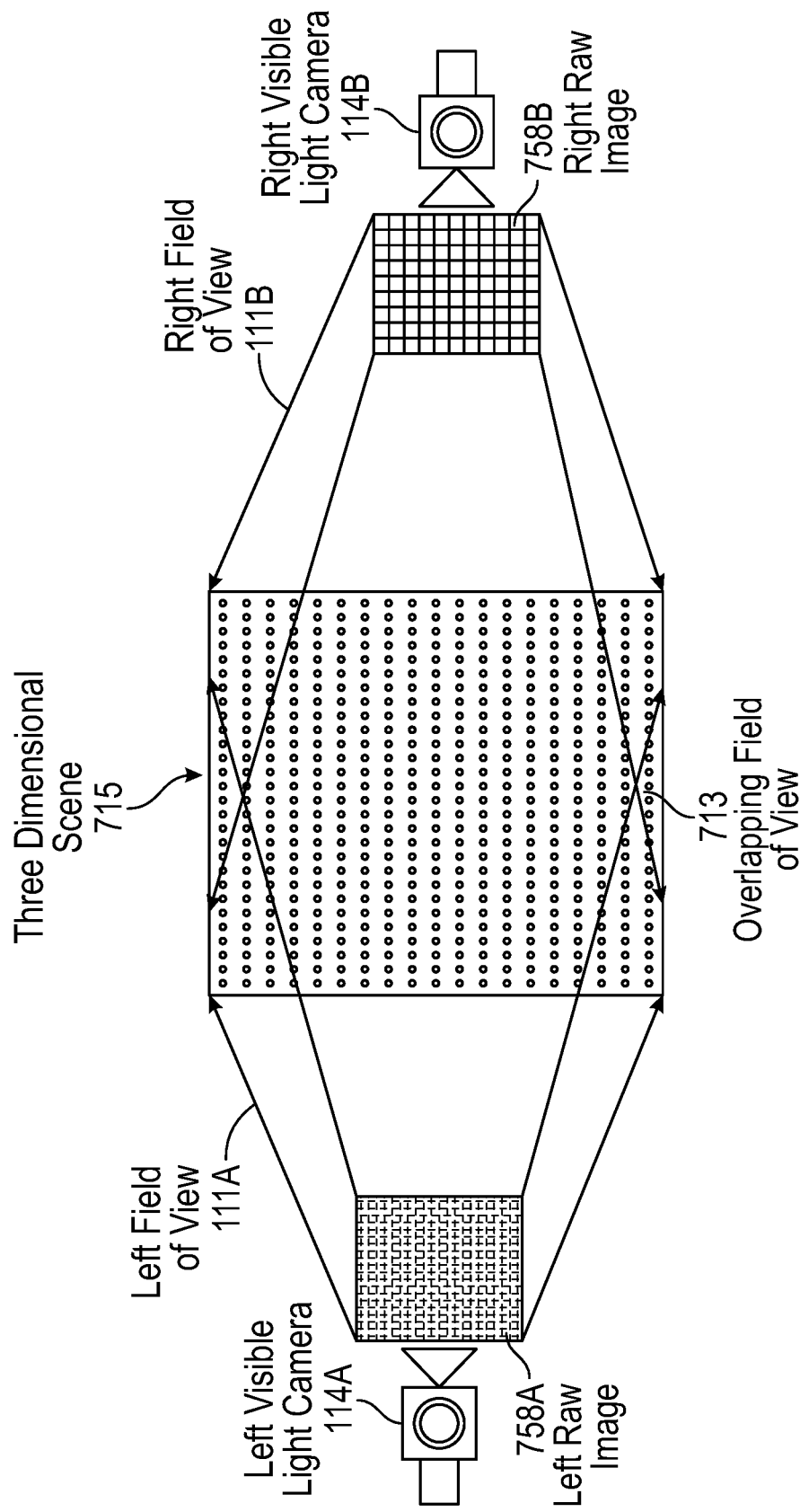
FIG. 7 depicts an example of visible light captured by the left visible light camera as a left raw image and visible light captured by the right visible light camera as a right raw image.

FIG. 7 depicts an example of capturing visible light with cameras. Visible light is captured by the left visible light camera 114A with a left visible light camera field of view 111A as a left raw image 758A. Visible light is captured by the right visible light camera 114B with a right visible light camera field of view 111B as a right raw image 758B. Based on processing of the left raw image 758A and the right raw image 758B, a three-dimensional depth map 715 of a three-dimensional scene, referred to hereafter as an image, is generated by processor 932.

Commercial UAVs typically include a camera for imaging the earth and other objects below, for instance, capturing still images and film. In some versions, the camera is fixed to the UAV, without the use of a gimbal for selectively positioning the camera. More complicated UAVs include an electronic receiver and an electronically configurable gimble and camera. A remotely located controller in eyewear 100 establishes a wireless control link with the receiver of the UAV to control the UAV, as well as the gimble and camera.

Figure 8A:
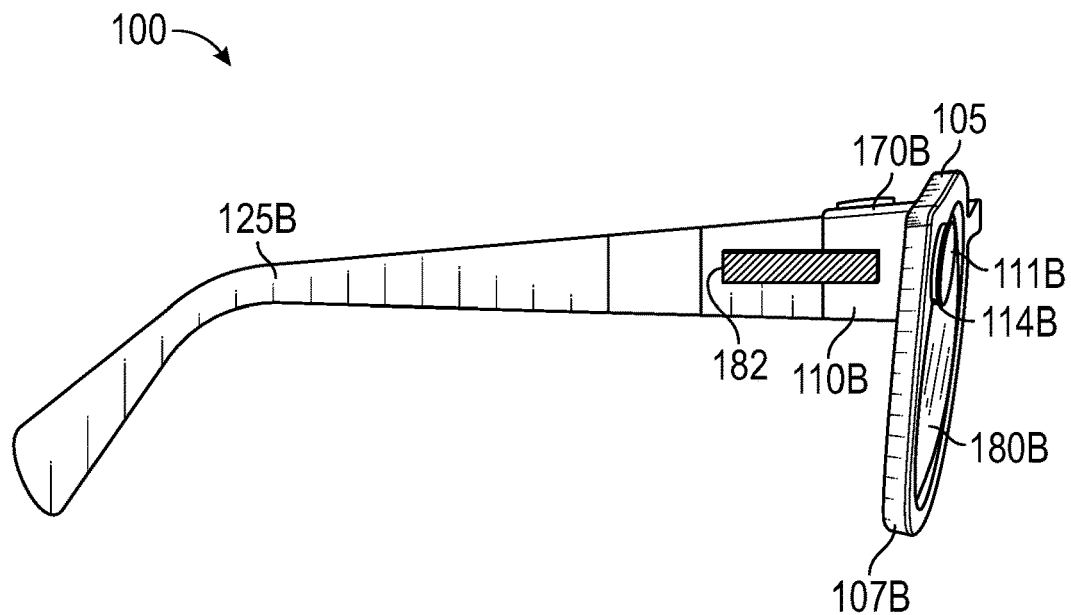
FIG. 8A is a side view of an example hardware configuration of an eyewear device, which shows a touchpad on the temple of the frame.

Referring to FIG. 8A, there is shown a side view of an example hardware configuration of the eyewear device 100, which includes a touchpad 182 located on the temple 110B of the frame 105. The touchpad 182 may also be located on temple 110A, or another portion of the frame 105. The touchpad 182 is configured to receive user input from the user. For example, the user input sensed by the touchpad 182 may be a swipe, tap, or hold of the touchpad 182 with the user's finger. The touchpad 182 may be configured and customized to recognize other user interactions with the touchpad 182 to be an input signal for the control of a variety of functions done by the eyewear 100. These functions may consist of, but not limited to, selecting or moving between menu options, turning on or off the eyewear 100, capturing an image, pausing or playing music, answering or ending a phone call, and controlling a wireless connected device.

Figure 8B:
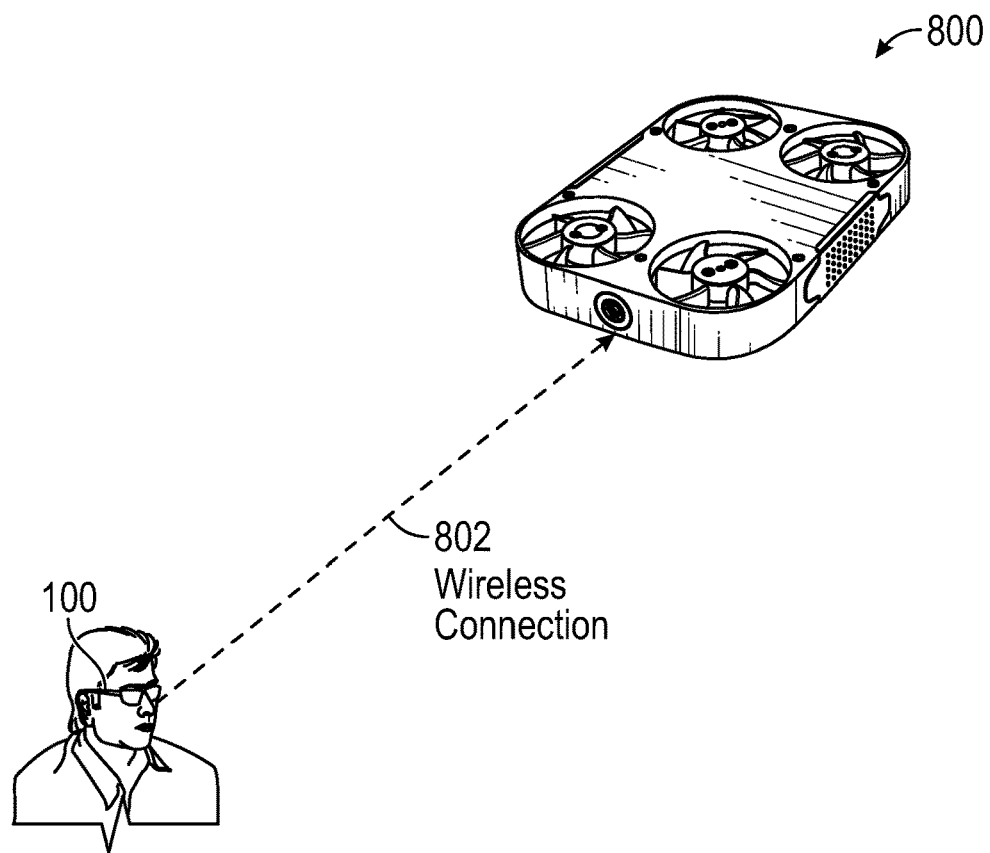
FIG. 8B illustrates a wireless connection between the eyewear and a UAV.

Referring now to FIG. 8B, one example of the eyewear 100 controlling the UAV 800 is shown. The eyewear 100 is coupled to the UAV 800 via a wireless connection 802 to send control signals from the eyewear 100 to the UAV 800 as a function of eyewear user input. The control signals may determine or alter the UAV's 800 flight path. For example, a control signal instructing the UAV 800 to move vertically, laterally, or to proceed towards a predetermined waypoint may be sent by the eyewear 100 as a function of the user input. Additionally, a signal from the UAV 800 may be sent to the eyewear 100 to transmit a varying amount of information including, but not limited to, the UAV's 800 heading, location, speed, and video feed or image from the camera 820 located on the UAV 800. This information may be displayed on the image display 180C-D of the eyewear 100.

Figure 8C:
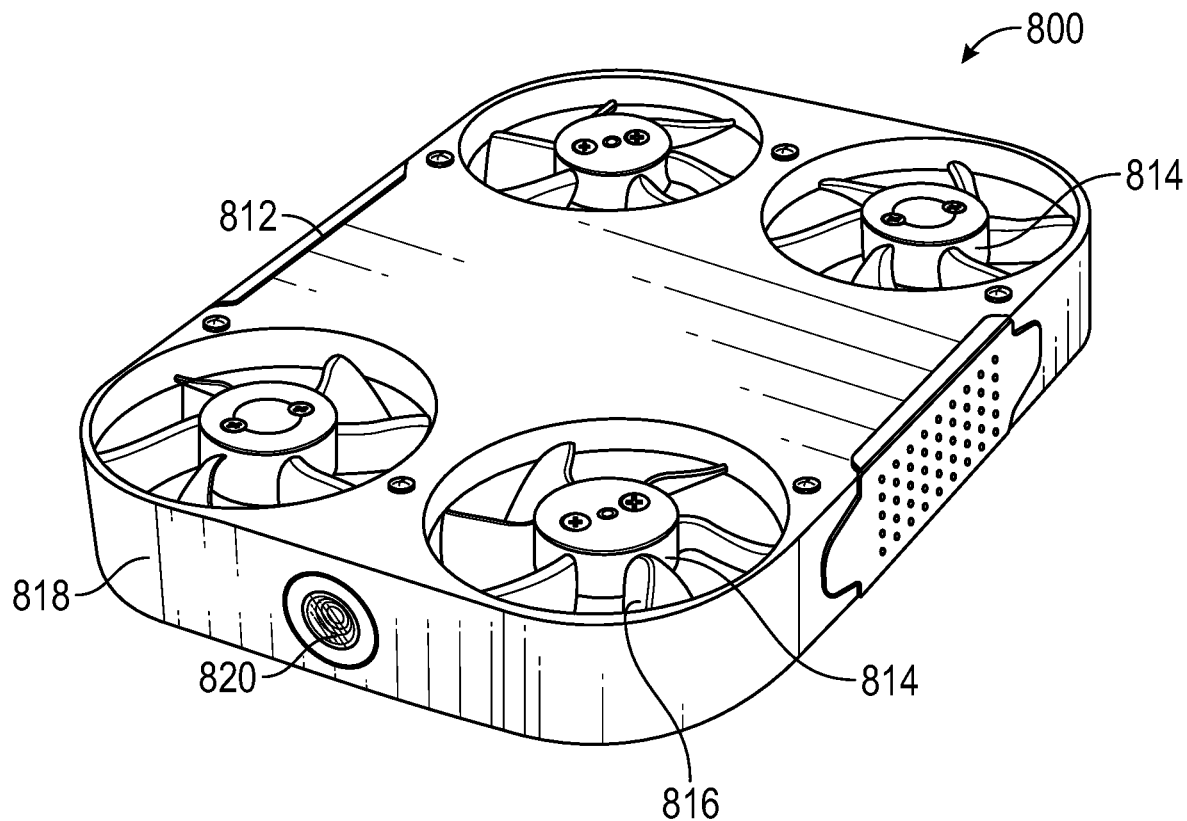
FIG. 8C illustrates a perspective view of a UAV with a fixed camera.

FIG. 8C illustrates a perspective view of a UAV 800 having a body 812 and a plurality of propellers 814 including multiple blades 816. The propeller 814 including blades 816 can be made out of metal or non-conductive material. Typically, non-conductive materials, such as plastic, are used since they are lighter.

Also shown in FIG. 8C is a camera 820 fixed to the body 812 at one side thereof shown at 818 at a fixed pitch angle with respect to the body 812. In this example, the camera 820 is facing horizontal from the body 812 so that the camera pitch angle is zero degrees. In other examples, the camera pitch angle can also be fixed at other pitch angles, such as −5 degrees downward from horizontal, or other pitch angles as desired.

Figure 8D:
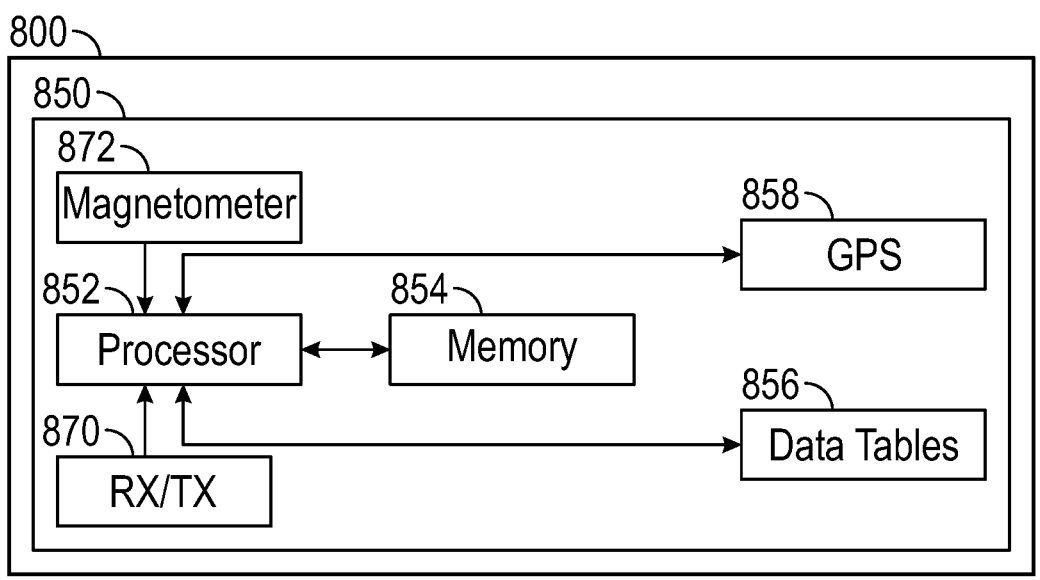
FIG. 8D illustrates a control system configured to control the UAV, including UAV operation along a flight path FP and at image capture points.

FIG. 8D illustrates a UAV control system 850 configured to control the UAV 800 as a function of the received control signals from the eyewear 100, including UAV operation along a flight path (FP). The control system 850 includes an electronic processor 852 comprising a flight controller, a memory 854 including flight plans, instructions, and code for operating processor 852 to control and operate the UAV 800, data tables 856 stored in memory 854, a global positioning system (GPS) receiver 858 for providing global positioning of the UAV 800, an RF transceiver 870, and a 3-axis magnetometer 872. The electronic processor 852 establishes the FP of the UAV 800 based on performance data in data tables 856 and the GPS 858, and the received control signals from eyewear 100. Multiple flight paths are stored in memory 854, wherein the flight paths can be custom programmed and downloaded by into memory 854 by a user of the UAV 800 wirelessly using wireless connection 802 or by a cable.

Figure 8E:
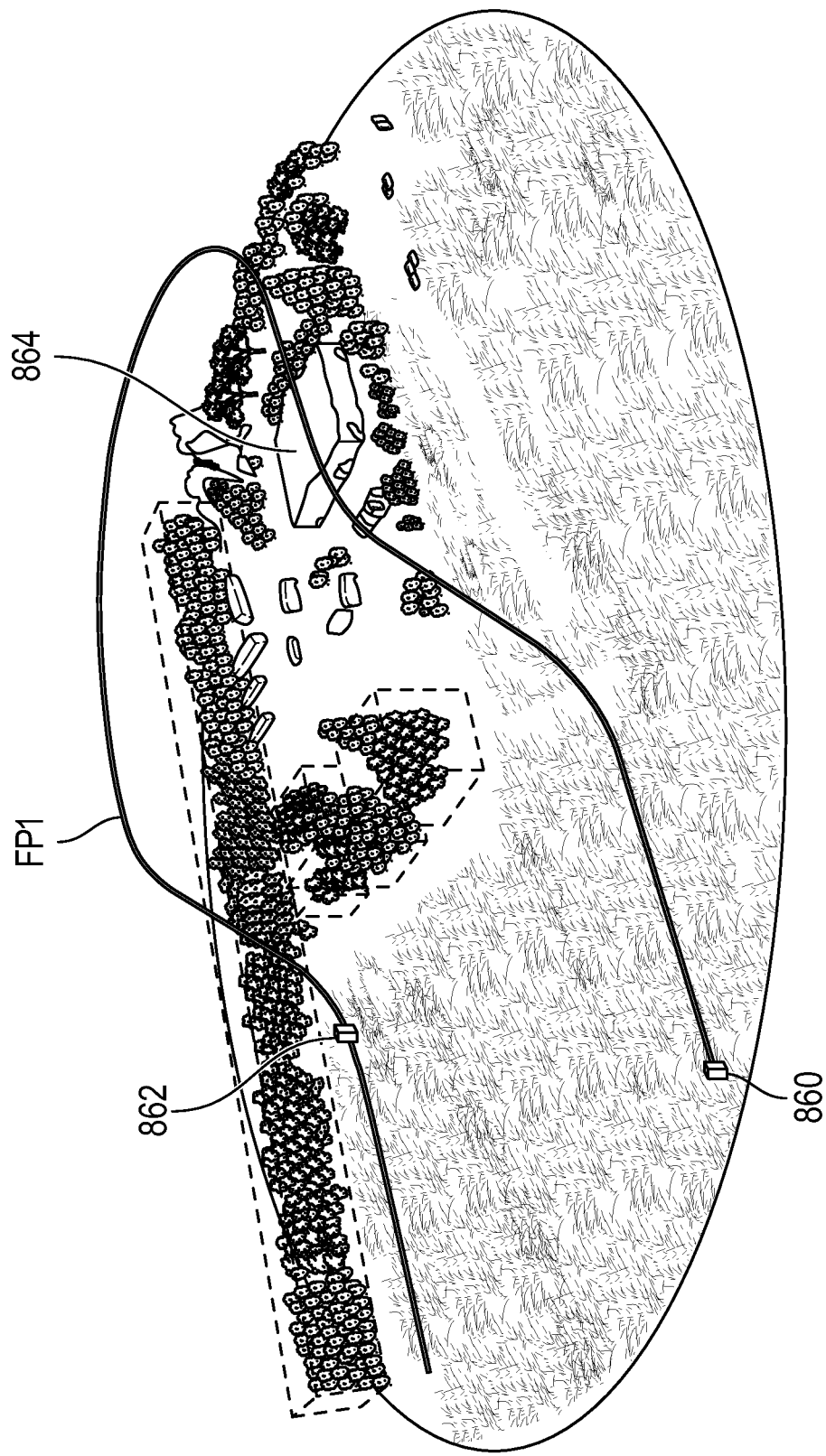
FIG. 8E illustrates a graphical representation of a flight path FP1 that routes the UAV.

FIG. 8E illustrates a graphical representation of a flight path FP1 that routes the UAV 800 from a starting position 860 to an end position 862. The FP1 routes the UAV 800 along a smooth path at varying altitudes to a target(s) 864, also referred to as a point of interest (POI). The target 864 can comprise of many features including buildings, trees, people etc. The limited or restricted spacing around the target 864 constrains and may limit the maneuvering of the UAV 800 about target 864, and thus the camera imaging. This spacing creates difficulty for the UAV 800 having a fixed position camera 820.

Figure 8F:
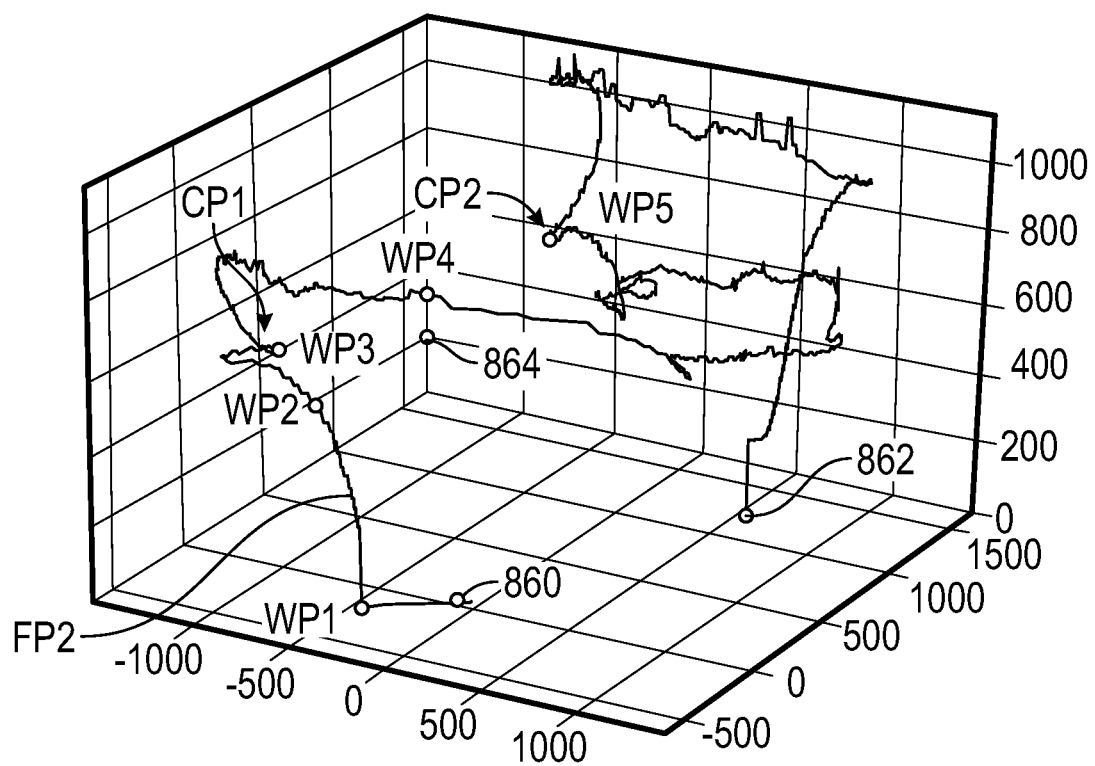
FIG. 8F illustrates a graphical representation of a more complex flight path FP2 that the UAV traverses to and about a target.
Figure 8G:
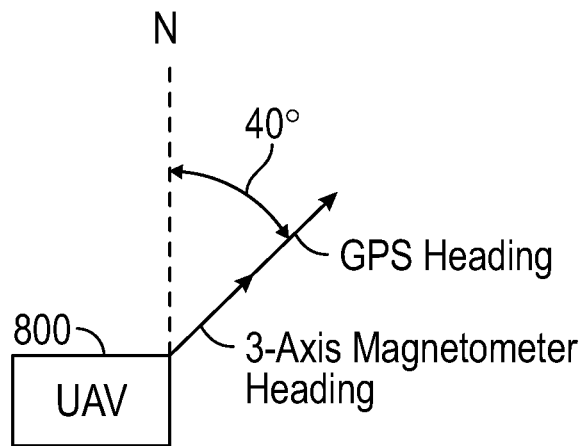
FIG. 8G illustrates alignment of a GPS heading and a magnetometer.
Figure 8H:
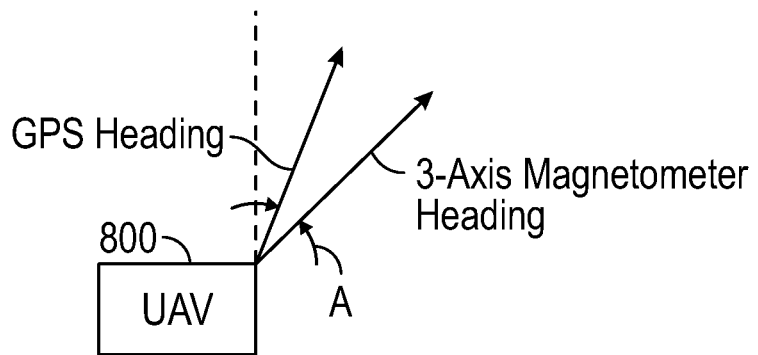
FIG. 8H illustrates misalignment of the GPS heading and the magnetometer.

FIG. 8F illustrates a graphical representation of a more complex flight path FP2 that the UAV 800 traverses to and about target 864. The flight path FP2 includes multiple waypoints WP and multiple image capture points including image capture points CP1 and CP2. The flight path FP2 also includes performance variables of the UAV 800, and the orientation of the UAV 800 including a pitch angle PA of the camera 820 with respect to horizontal at each waypoint, including proximate the image capture points CP1 and CP2. In this example, the UAV 800 traverses the flight path FP2 having multiple waypoints to image capture point CP1 proximate the target 864.

In an example, the flight path FP2 orients the UAV 800 such that the camera 820 (and the side of body 812) is directed upwardly at a pitch angle PA3 facing target 864 when approaching, and at, image capture point CP1. The camera 820 captures images of target 864 at image capture point CP1 for a predetermine image capture time and stores the images in memory 854. The UAV 800 subsequently traverses flight path FP2 to image capture point CP2 proximate target 864. The flight path FP2 also orients the UAV 800 such that the camera 820 (and the side of body 812) is directed downwardly at a pitch angle PA5 toward target 864. The camera 820 again captures images at image capture point CP2 and stores the images in memory 854.

Since the camera 820 is fixed to body 812 at the fixed pitch angle, orienting the UAV 800 in a predetermined stable position at an angle is not an ordinary task. More importantly, establishing a predetermined camera angle of the camera 820 relative to the target 864 at capture points CP1 and CP2, is not an ordinary task. The flight paths are automatically determined by electronic processor 852 based upon the GPS position of the capture points CP1 and CP2, and the desired camera pitch angle at capture points CP1 and CP2. The processor 852 determines the operational parameters of the UAV 800, and it takes into account the weight and flight performance of the UAV 800. The determined flight paths increase the image capture time at capture points CP1 and CP2, at the desired pitch angle, which is very beneficial for imaging.

The UAV 800 includes the 3-axis magnetometer 872 so that the processor 852 can measure a change in angle as the UAV 800 drone flies North/South. (The 3-axis magnetometer 872 does not detect East/West movement). The processor 852 compares the heading data of the 3-axis magnetometer 872 to the heading data from the GPS 858, and determines if this heading information is correlated. An alert to the ground station is generated by the UAV 800 if there is a data mismatch. The ground station can respond, such as by instructing the UAV 800 to return to the ground station. In addition, the UAV 800 may unilaterally decide to return to the home station, such as if it is on an unprogrammed path.

Figure 9:
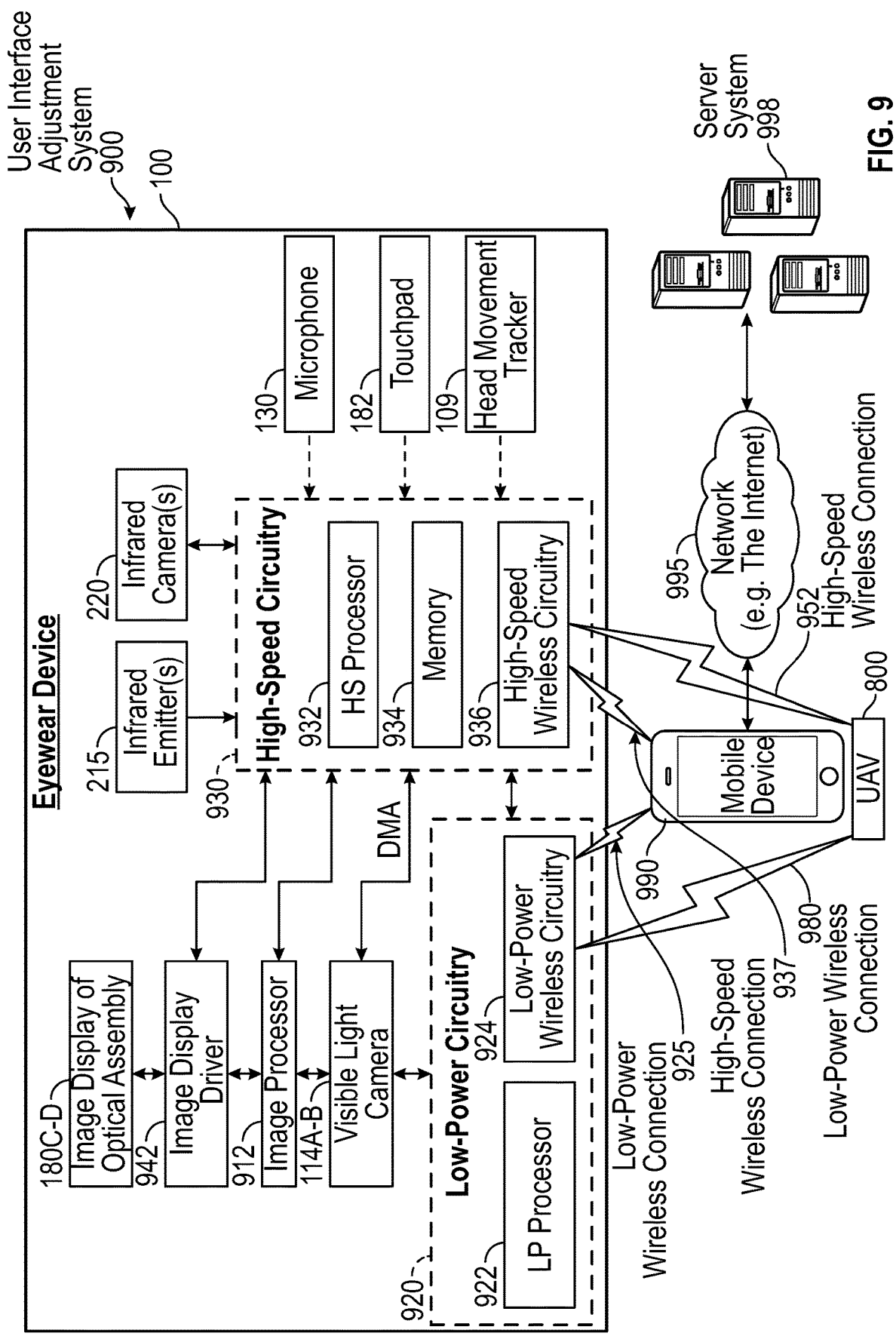
FIG. 9 illustrates a block diagram of electronic components of the eyewear device, including communication between the eyewear and the UAV.

Referring back to FIG. 8B, there are multiple examples for the eyewear 100 to control the UAV 800. A variety of inputs may be used by the user of the eyewear 100 to generate the control signals for the UAV 800. One example of an input used by the user includes the touchpad 182 of the eyewear 100 configured to generate input signals to the processor 932 (FIG. 9). The processor 932 of the eyewear 100 is responsive to the received input signals generated by the touchpad 182 and generates control signals that are sent to the UAV 800 via the wireless connection 802. For example, a swipe up by the user's finger on the touchpad 182 may result in a control signal for the UAV 800 to gain altitude, a swipe down may result in the decrease in altitude or landing, a swipe forward may result in the UAV 800 moving forward or to gain forward velocity, a swipe backwards may result in the UAV slowing down, stopping, or moving backwards.

Another example of an input being used to control the UAV 800 includes the head movement tracker 109 of the eyewear 100 configured to control the UAV 800 by measuring the movements of the user's head. The processor 932 of the eyewear 100 is responsive to the input signal generated by the head movement tracker 109 and generates control signals that are sent to the UAV 800 via the wireless connection 802. For example, a user turning their head to the left may be measured by the head movement tracker 109 and result in a control signal for the UAV 800 to turn left. Additionally, the user looking upwards may result in a control signal for the UAV 800 to gain altitude. Specific head gestures, movements, or combinations of head movements are recognized by the processor 932, which in turn generates custom control signals for controlling the UAV. For example, the user shaking their head back and forth is detected by the head movement tracker 109 and results in a control signal sent to the UAV 800 to cancel the current flight path and return to the user.

Another example of an input being used to control the UAV includes the microphone 130 of the eyewear 100 configured to control the UAV 800 by voice commands of the user. The processor 932 of the eyewear 100 is responsive to the input signal generated by the microphone 130 to send control signals to the UAV 800 via a wireless connection 802. For example, the user may generate the voice command, "UAV go up," to result in the eyewear 100 sending a control signal to the UAV 800 resulting in the UAV 800 gaining a predetermine altitude, such as 10 ft. A subsequent voice command of "Up" would cause the UAV to go up another predetermined amount, such as 10 ft. Voice commands may be used alter the flight path of the UAV 800 by changing the heading, speed, and altitude of the UAV 800. Voice commands may also be used to cancel the current flight path or land the UAV 800.

In another example, the input can be one of the cameras 114. The camera 114 may be configured to detect mid-air gestures of the user to control the UAV 800. For example, the user can motion a finger or hand forward of the eyewear to result in the eyewear 100 sending a control signal to the UAV 800, resulting in the UAV going forward. If the user raises a finger or hand upwardly, then the UAV 800 would responsively gain altitude.

Figure 8I:
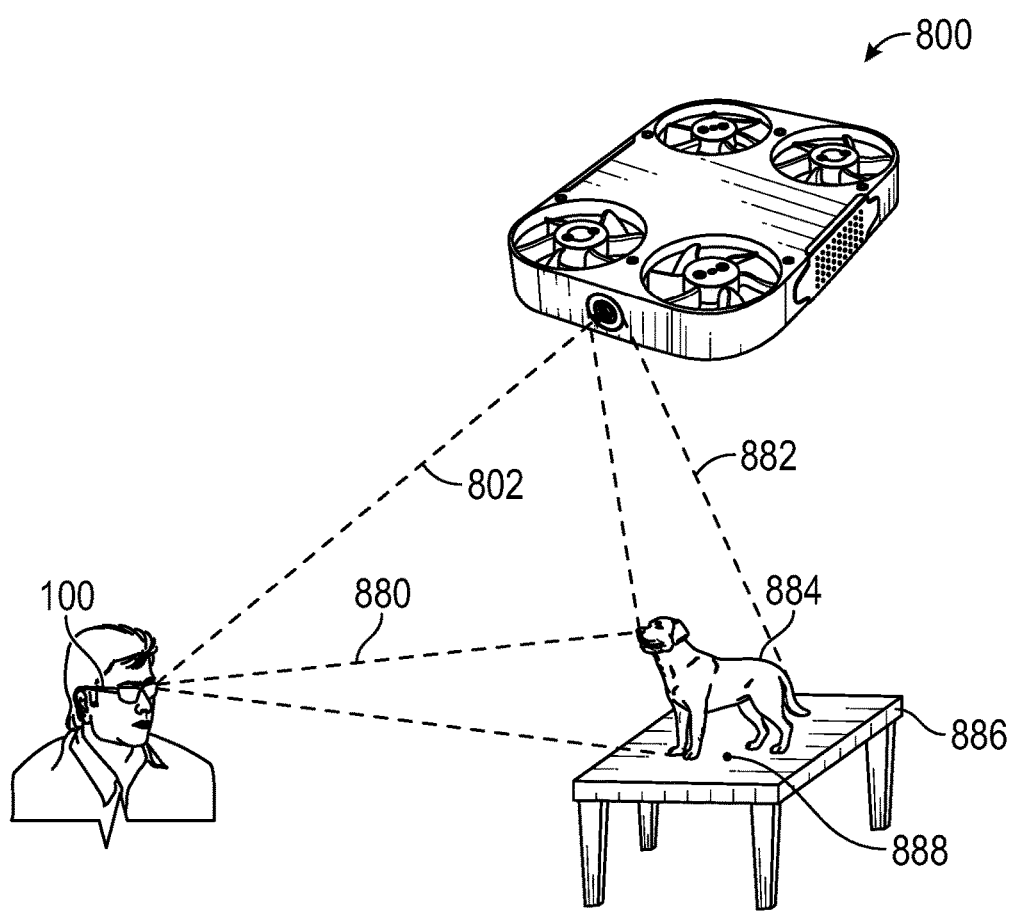
FIG. 8I illustrates an eyewear camera and a UAV camera viewing and capturing video images of the same object.

Referring now to FIG. 8I, there is illustrated an example where the user of the eyewear 100 and the UAV 800 view and record the same object(s) in an environment. The cameras 114 of the eyewear 100 have a field of view shown at 880, and the camera 820 of the UAV 800 has a field of view shown at 882. The viewable object 884 is located at a position 888, and in one example is a dog, as shown, situated on table 886.

The images captured by the UAV 800 are wirelessly communicated back to the eyewear 100 using transceiver 870 via wireless connection 802. The processor 932 processes the received UAV 800 images, and stores them in memory 934 along with the images captured by the cameras 114. The frames of the UAV 800 images and the camera 114 images are time-stamped by the processor 932.

The eyewear 100 is synchronized with the UAV 800 during video recording of the object 884. In one example, the moment the user of eyewear 100 starts recording a video of the object 884 using cameras 114 from a 1st person view, the controller 932 responsively controls the UAV 800 via wireless connection 802 to start recording video using camera 820 from a 3rd person view. Time stamps are added to the recording video by the respective controllers of the eyewear 100 and UAV 800. In accordance with this example, the moment the user of eyewear 100 stops recording, the UAV 800 stops recording too. The controller 932 resolves any latency issues while creating the time stamps, e.g., through the synchronization or by adjusting for detected latency.

Figure 8J:
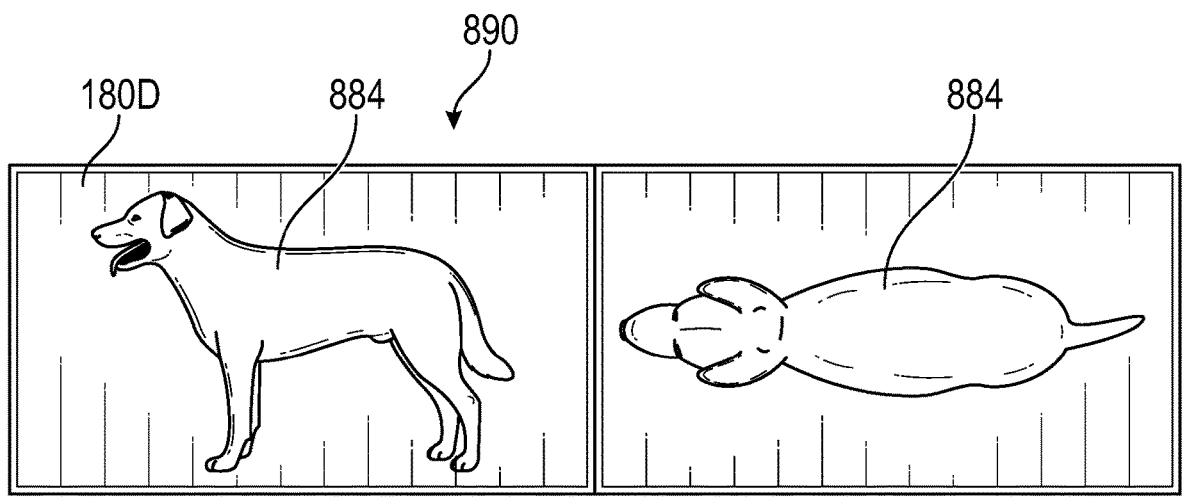
FIG. 8J illustrates a stitched video including synchronized images from both the eyewear camera and the UAV camera.

Utilizing the eyewear 100 and the UAV 800 forms a "movie crew in the box," as the processor 932 produces a stitched video 890 with 1st and 3rd person perspective that is synchronized second by second. The stitched video 890 can be displayed on the displays 180C and 180D, where display 180D is shown in FIG. 8J, or on a display remote from the eyewear 100. The eyewear video frames are displayed on the left side of the display 180D, and the UAV video frames are displayed on the right side of the display 180D. The frames are synchronized in time using the respective timestamps.

The UAV 800 can be controlled to hover over the object 884 at position 888 at a predetermined distance, such as 10 feet, or a selected distance. In one example, the UAV 800 can be manually controlled and positioned relative to the object 884, such as by the user using the inputs of the eyewear 100 as described, such as touchpad 182. In another example, the eyewear 100 can automatically determine the object position 888, such as by knowing the location of the eyewear 100 using an internal GPS, and then using gazing to determine the direction and distance of the object 884 relative to the eyewear 100. The object position 888 can be an x, y, z position in one example, and a GPS location in another example. The processor 932 of eyewear 100 can instruct the UAV 800 to automatically go to position 888, and hover over object 884 such that the UAV camera 820 views the object 884 from above.

This technology allows a user to experience augmented reality (AR) in a synchronized way as well. For instance, if the eyewear user looks at an (shared) AR dog from eyewear 100 with a 1st person view, the processor 932 can produce AR images from a $3^{rd}$ person point of view as if it was from the UAV above the dog.

Referring to FIG. 9, the figure depicts a high-level functional block diagram including example electronic components disposed in eyewear 100/200. The illustrated electronic components include the processor 932, the memory 934, and the see-through image display 180C and 180D including the embedded antennas 808.

Memory 934 includes instructions for execution by processor 932 to implement functionality of eyewear 100/200, including instructions for processor 932 to control in the image 715. Processor 932 receives power from battery (not shown) and executes the instructions stored in memory 934, or integrated with the processor 932 on-chip, to perform functionality of eyewear 100/200, and communicating with external devices via wireless connections.

A user interface adjustment system 900 includes a wearable device, which is the eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

The eyewear device 100 includes multiple inputs including the microphone 130, the touchpad 182, the head movement tracker 109 and camera 114 each configured to produce input signals for the processor 932. The processor 932 responsively generates control signals that are communicated with the UAV 800 using either, or both, a low-power wireless connection 950 and a high-speed wireless connection 952, which collectively are referred to as the wireless connection 802. UAV 800 may be a drone, helicopter, plane, or any other such device capable of moving through the air without a pilot onboard.

Eyewear device 100 includes at least two visible light cameras 114A-B (one associated with the left lateral side 170A and one associated with the right lateral side 170B). Eyewear device 100 further includes two see-through image displays 180C-D of the optical assembly 180A-B (one associated with the left lateral side 170A and one associated with the right lateral side 170B). Eyewear device 100 also includes image display driver 942, image processor 912, low-power circuitry 920, and high-speed circuitry 930. The components shown in FIG. 9 for the eyewear device 100/200 are located on one or more circuit boards, for example a PCB or flexible PCB, in the temples 110A-B as previously described. Alternatively, or additionally, the depicted components can be located in the temples, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 934 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B to produce the virtual image. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 can include short range transceivers (e.g., UWB or Bluetooth™) and wireless wide, local, or wide area network transceivers (e.g., cellular or WiFi) including antennas 808. Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements 919. Such peripheral device elements may include biometric sensors, additional sensors, or display elements integrated with eyewear device 100. For example, peripheral device elements 919 may include any I/O components including output components, motion components, position components, or any other such elements described herein. The eyewear device 100 can take other forms and may incorporate other types of frameworks, for example, a headgear, a headset, or a helmet.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

Figure 10:
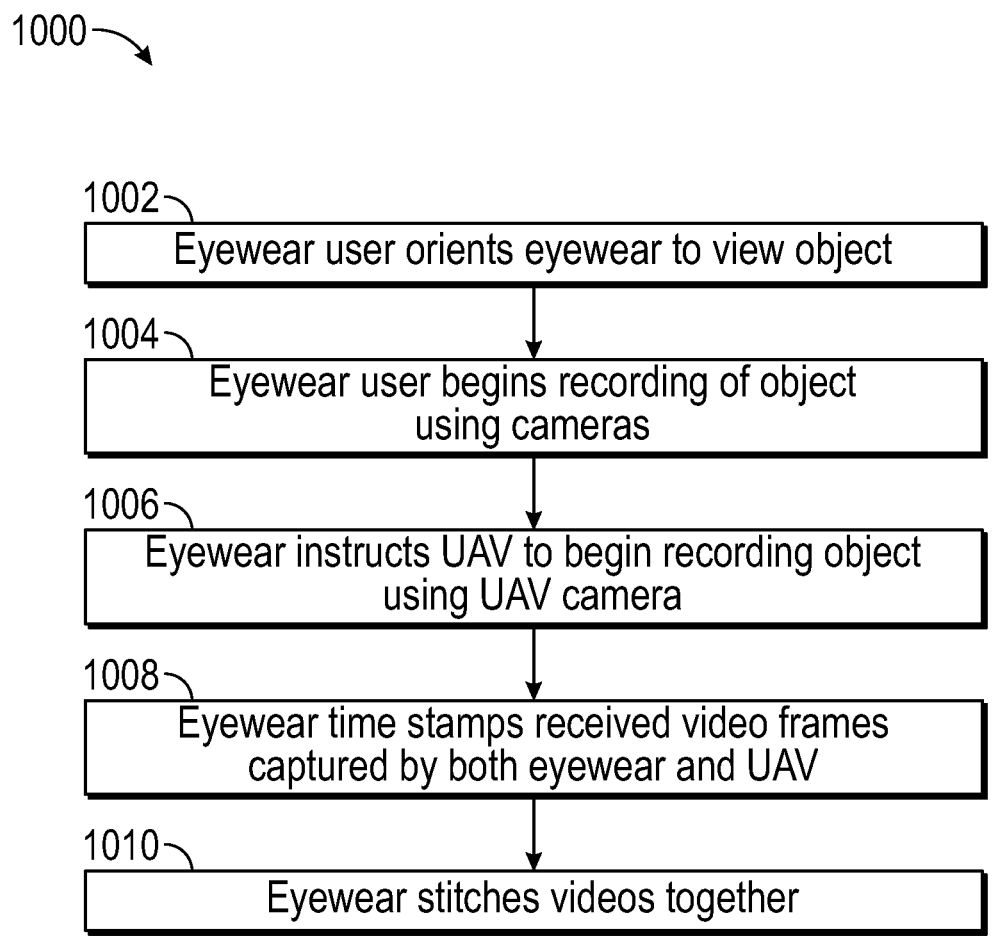
FIG. 10 is a flowchart of the operation of the eyewear creating the stitched video.

FIG. 10 is a flowchart 1000 illustrating the operation of the eyewear 100 controlling the UAV 800 and creating a stitched video 890 as illustrated in FIG. 8J. These blocks do not need to be performed sequentially, and the processing and wireless communications can be performed simultaneously.

At block 1002, the user of the eyewear 100 orients the eyewear 100 to view one or more objects 884 in the environment at position 888. The environment can be an open space, such as in a field, or in a closed space such as a room. The view can be selected by viewing the objects 884 through the eyewear optical assemblies 180A and 180B such that the cameras 114 are directed toward the objects 884. The UAV 800 is also positioned such that camera 820 views the object 884. This may be done by the user of the eyewear 100 using an input, such as the touchpad 182, to manually position the UAV 800 to position 888 in one example, and the processor 932 sending an instruction via wireless link 802 to the UAV 800 to go to position 888 in another example.

At block 1004, the user of eyewear 100 begins recording a video of the objects 884 using cameras 114. The recording can be initiated and controlled using touchpad 182, such as by the eyewear user tapping the touchpad 180 twice in as short period of time. Each frame of video captured by cameras 114 is timestamped by controller 932 and stored in memory 934.

At block 1006, when the user initiates the recording in block 1004, the processor 932 of eyewear 100 simultaneously instructs the UAV 800 to begin recording the objects 884 viewed by camera 820. The processor 932 instructs the UAV 800 via wireless connection 802. The processor 932 may delay the recording using cameras 114 a short time period corresponding to the known latency for the UAV 800 to begin recording.

At block 1008, the eyewear 100 receives the video captured by camera 820 of the UAV 800 via wireless connection 802 and timestamps each frame of received video. The processor 932 stores the timestamped video frames in memory 934.

At block 1010, the processor 932 retrieves the stored video frames captured by the cameras 114 and the stored video frames captured by the UAV camera 820 based on the timestamps of the frames. The processor 932 produces the stitched video 890 as shown in FIG. 8J and displays the stitched video on display 180C and 180D. It is noted that the processor may receive and stitch the received videos and simply display the stitched video 890 on the display 180C and 180D, or any display such as a remote display, without storing the frames in memory 934. In this example, the received video is buffered and available to the processor 934 for processing.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:
a frame;
an eyewear camera configured to capture camera video images of an object; and
a processor configured to:
control an unmanned aerial vehicle (UAV) to capture UAV video images of the object using a UAV camera;
receive the UAV video images from the UAV; and
process the camera video images and the UAV video images in relation to one another, wherein the processor is configured to delay a recording using the eyewear camera a time period corresponding to a latency for the UAV to begin recording.

2. The eyewear of claim 1, wherein the processor is configured to stitch the camera video images and the UAV camera video images to produce stitched video images.

3. The eyewear of claim 2, wherein the processor is configured to timestamp frames of the camera video images and frames of the UAV camera video images, such that the stitched video images are synchronized as a function of the respective timestamps.

4. The eyewear of claim 2, wherein the eyewear includes a see-through display supported by the frame, and the stitched images are configured to be displayed on the see-through display.

5. The eyewear of claim 2, wherein the stitched images are configured to be displayed on a remote display.

6. The eyewear of claim 1, wherein the eyewear camera is configured to generate a 1st person view of the object, and the UAV camera is configured to generate a 3rd person view of the object.

7. The eyewear of claim 1, wherein the camera video images and the UAV video images are configured to be stored in memory.

8. The eyewear of claim 1 wherein the processor is configured to process the camera video images and the UAV video images as a function of latency.

9. A method of using eyewear comprising a frame, an eyewear camera configured to capture camera video images of an object, and a processor, the processor:
controlling an unmanned aerial vehicle (UAV) to capture UAV video images of the object using a UAV camera;
receiving the UAV video images from the UAV; and
processing the camera video images and the UAV video images in relation to one another, wherein the processor delays a recording using the eyewear camera a time period corresponding to a latency for the UAV to begin recording.

10. The method of claim 9, wherein the processor stitches the camera video images and the UAV camera video images to produce stitched video images.

11. The method of claim 10, wherein the processor timestamps frames of the camera video images and frames of the UAV camera video images, such that the stitched video images are synchronized as a function of the respective timestamps.

12. The method of claim 10, wherein the eyewear includes a see-through display supported by the frame, and the stitched images are displayed on the see-through display.

13. The method of claim 9, wherein the eyewear camera generates a 1st person view of the object, and the UAV camera generates a 3rd person view of the object.

14. The method of claim 9, wherein the camera video images and the UAV video images are stored in memory.

15. The method of claim 9, wherein the processor processes the camera video images and the UAV video images as a function of latency.

16. A non-transitory computer-readable medium storing program code which, when executed, is operative to cause a processor of eyewear comprising a frame and an eyewear camera configured to capture camera video images of an object, to:
control an unmanned aerial vehicle (UAV) to capture UAV video images of the object using a UAV camera;
receive the UAV video images from the UAV; and
process the camera video images and the UAV video images in relation to one another, wherein the processor is configured to delay a recording using the eyewear camera a time period corresponding to a latency for the UAV to begin recording.

17. The non-transitory computer-readable medium storing program code of claim 16, wherein the program code is operative to stitch the camera video images and the UAV camera video images to produce stitched video images.

18. The non-transitory computer-readable medium storing program code of claim 17, wherein the program code is operative to timestamp frames of the camera video images and frames of the UAV camera video images, such that the stitched video images are synchronized as a function of the respective timestamps.

19. The non-transitory computer-readable medium storing program code of claim 17, wherein the eyewear includes a see-through display supported by the frame and the program code is operative to display the stitched images on the see-through display.

20. The non-transitory computer-readable medium storing program code of claim 16, wherein the program code is operative to process the camera video images and the UAV video images as a function of latency.

* * * * *